June 2, 1953  R. L. SIEGGREEN  2,640,591
AUTOMATIC HANDLING AND HARDNESS TESTING MECHANISM
Filed Jan. 10, 1950  7 Sheets-Sheet 1

*INVENTOR.*
RICHARD L. SIEGGREEN

BY
McDonald & Teagno
ATTORNEYS

June 2, 1953 R. L. SIEGGREEN 2,640,591
AUTOMATIC HANDLING AND HARDNESS TESTING MECHANISM
Filed Jan. 10, 1950 7 Sheets-Sheet 2

INVENTOR.
RICHARD L. SIEGGREEN

BY *McDonald & Feagno*

ATTORNEYS

*INVENTOR.*
RICHARD L. SIEGGREEN

BY McDonald & Feagns

ATTORNEYS

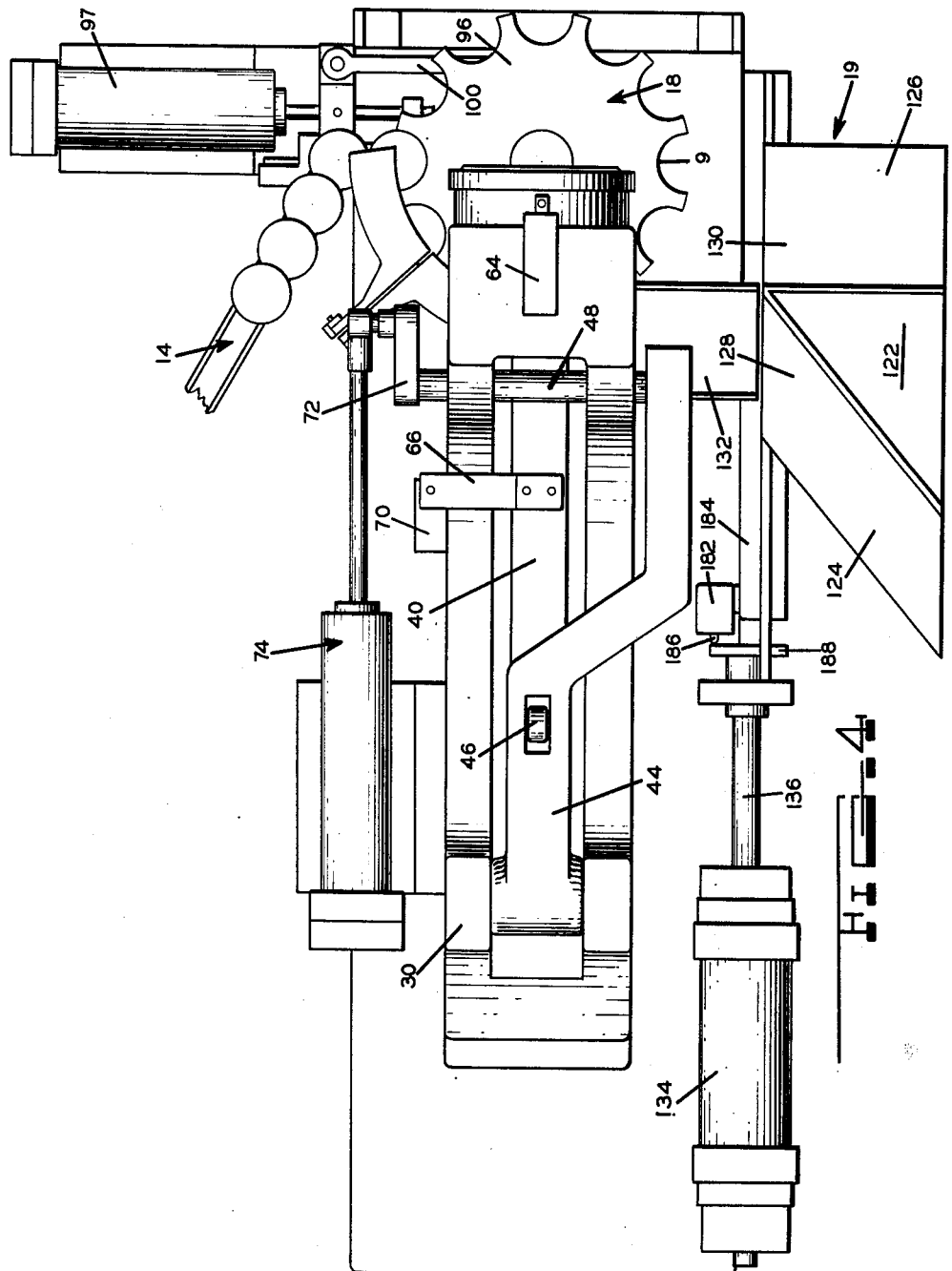

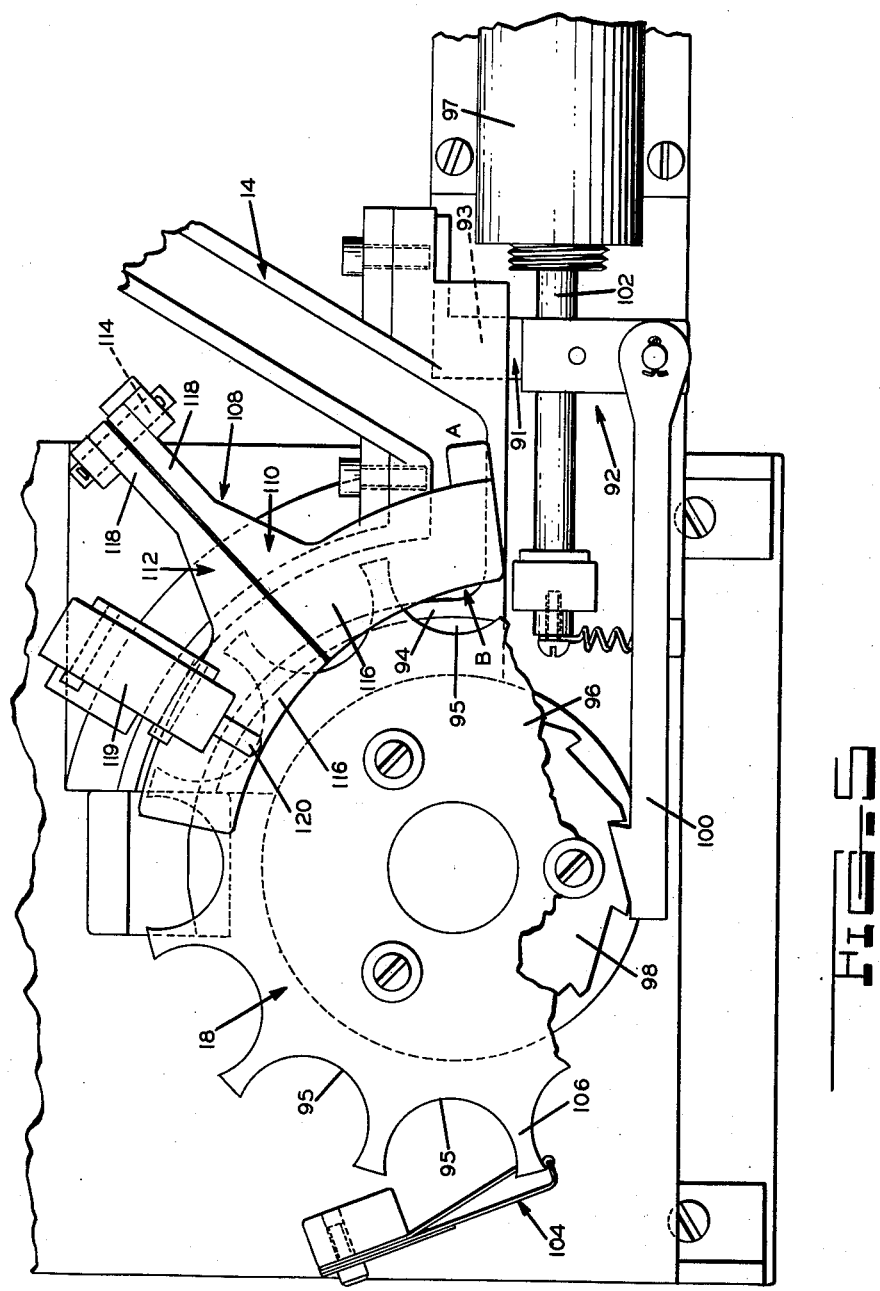

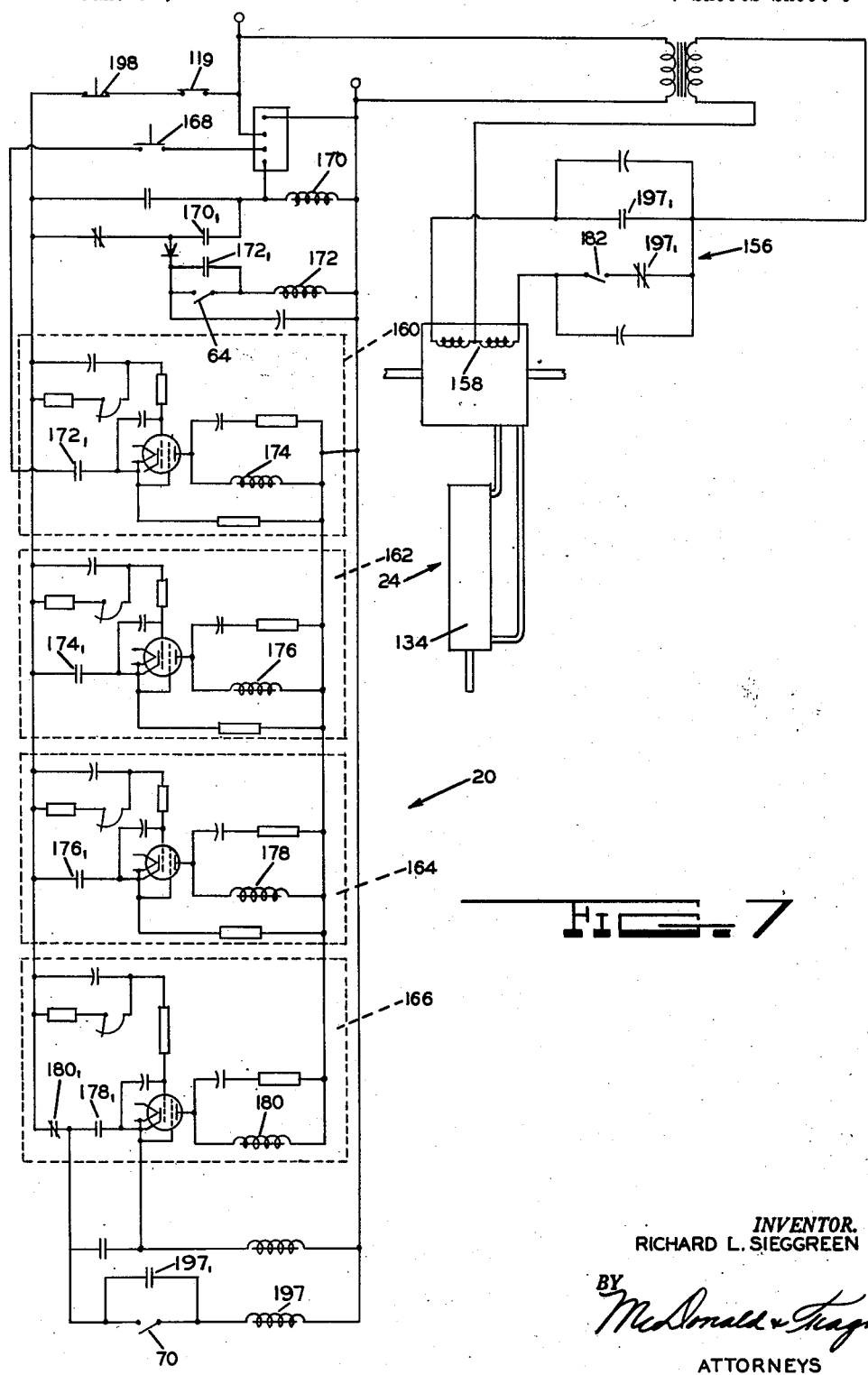

June 2, 1953 R. L. SIEGGREEN 2,640,591
AUTOMATIC HANDLING AND HARDNESS TESTING MECHANISM
Filed Jan. 10, 1950 7 Sheets-Sheet 7
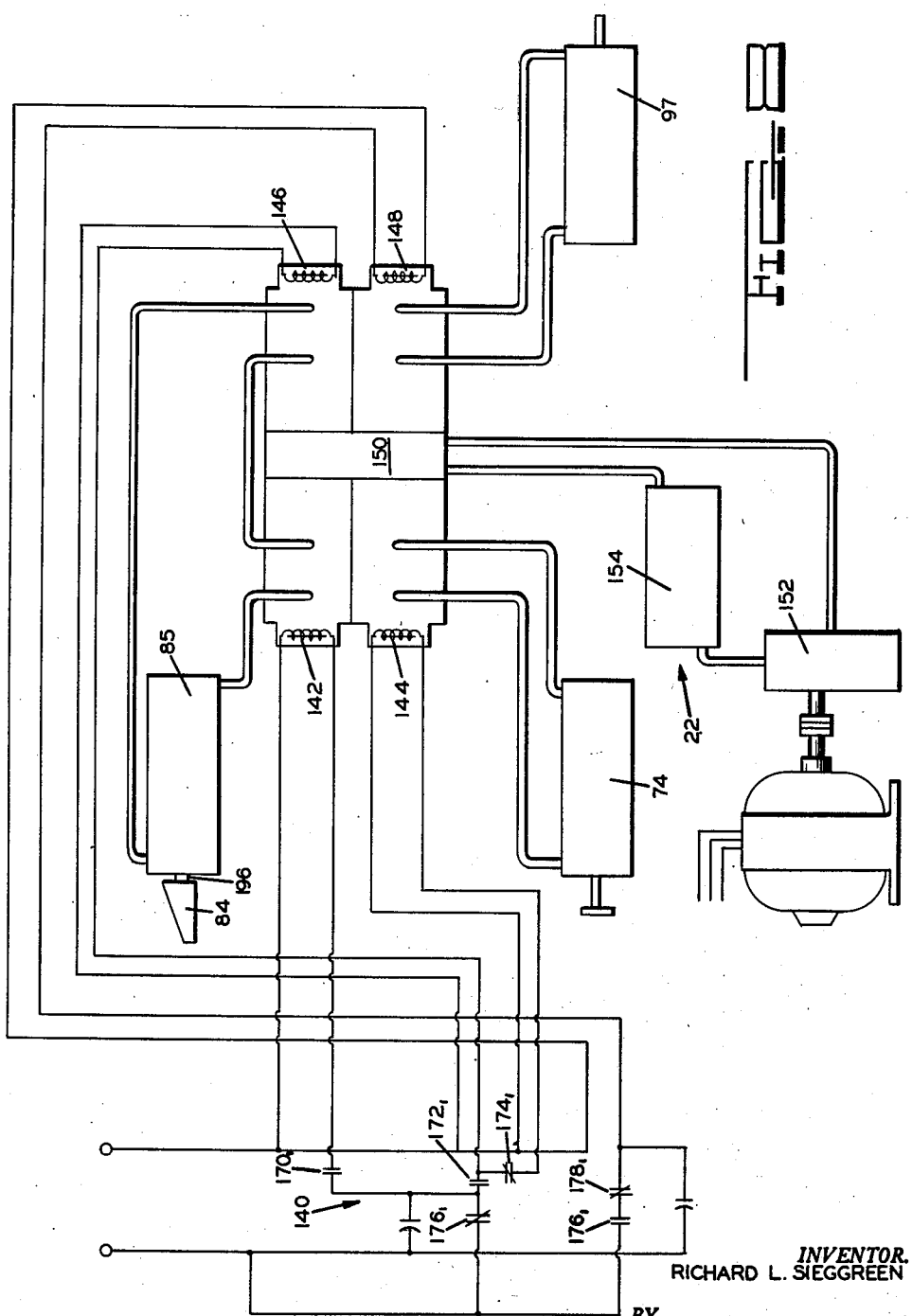
INVENTOR.
RICHARD L. SIEGGREEN
BY McDonald & Teagus
ATTORNEYS Patented June 2, 1953

2,640,591

UNITED STATES PATENT OFFICE 2,640,591

AUTOMATIC HANDLING AND HARDNESS TESTING MECHANISM

Richard L. Sieggreen, Saginaw, Mich., assignor to Eaton Manufacturing Company, Cleveland, Ohio, a corporation of Ohio Application January 10, 1950, Serial No. 137,753

9 Claims. (Cl. 209—79)

This invention relates to hardness testing and more particularly to the automatic hardness testing of metallic articles or the like.

Broadly, the invention comprehends the provision of a mechanism for the automatic production handling and hardness testing of the cam contacting surfaces of engine tappets and incorporating therein mechanism for the rejection of tappets having hardness below a predetermined limit.

An object of the invention is the provision of a mechanism that can automatically, quickly, effectively, and economically hardness test articles requiring a predetermined limit of hardness.

Another object of the invention is the provision of an automatically operated mechanism for quickly and accurately hardness testing and sorting out from the articles tested those not having the desired hardness.

A further object of the invention is the provision of a mechanism for automatically handling and hardness testing predetermined surfaces of articles so as to eliminate the possibility of errors caused by the human element and fatigue in the manual handling and testing of said articles while at the same time materially increasing output with a saving of labor.

A yet further object of the invention is the provision of a mechanism for automatically handling and hardness testing articles of a predetermined nature wherein all the operative parts thereof are either hydraulically or pneumatically actuated controlled in proper timed sequence to one another from a master electronic control system such that a positive consistent mode of testing within predetermined established limits of hardness is possible whereby the articles meeting hardness approval are ejected into one receptacle and the rejected articles are ejected into another receptacle.

Other objects and advantages of the invention will appear from the following description taken in connection with the drawings, forming a part of the specification, and in which:

Fig. 4 is a top plan view of the mechanism of Fig. 1;

Fig. 5 is an enlarged partly broken away view of a turntable indexing and article insertion mechanism forming a part of the mechanism of Fig. 1;

Fig. 7 is a schematic layout of the electronic system for controlling the operation of solenoid actuated valves which control fluid flow for the operation of fluid operated mechanisms incorporated in the mechanism of Fig. 1; and Fig. 8 is a schematic layout of the electrical system for the solenoid valves and the hydraulic system to be controlled thereby.

Figure 1:
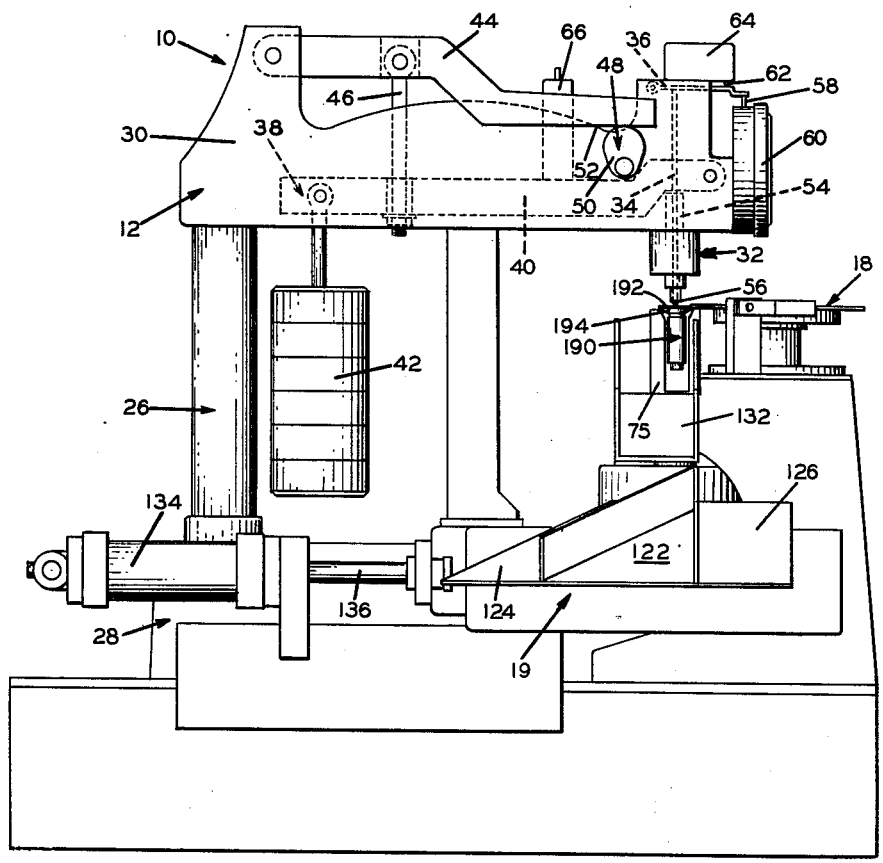
Fig. 1 is a side elevational view of an automatic handling and hardness testing mechanism.
Figure 6:
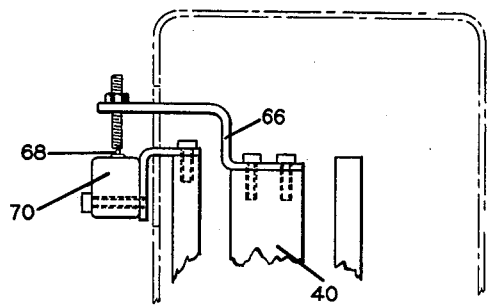
Fig. 6 is an enlarged fragmentary end plan view of an electrical micro-switch member associated with the hardness testing apparatus weight supporting lever.
Figure 2:
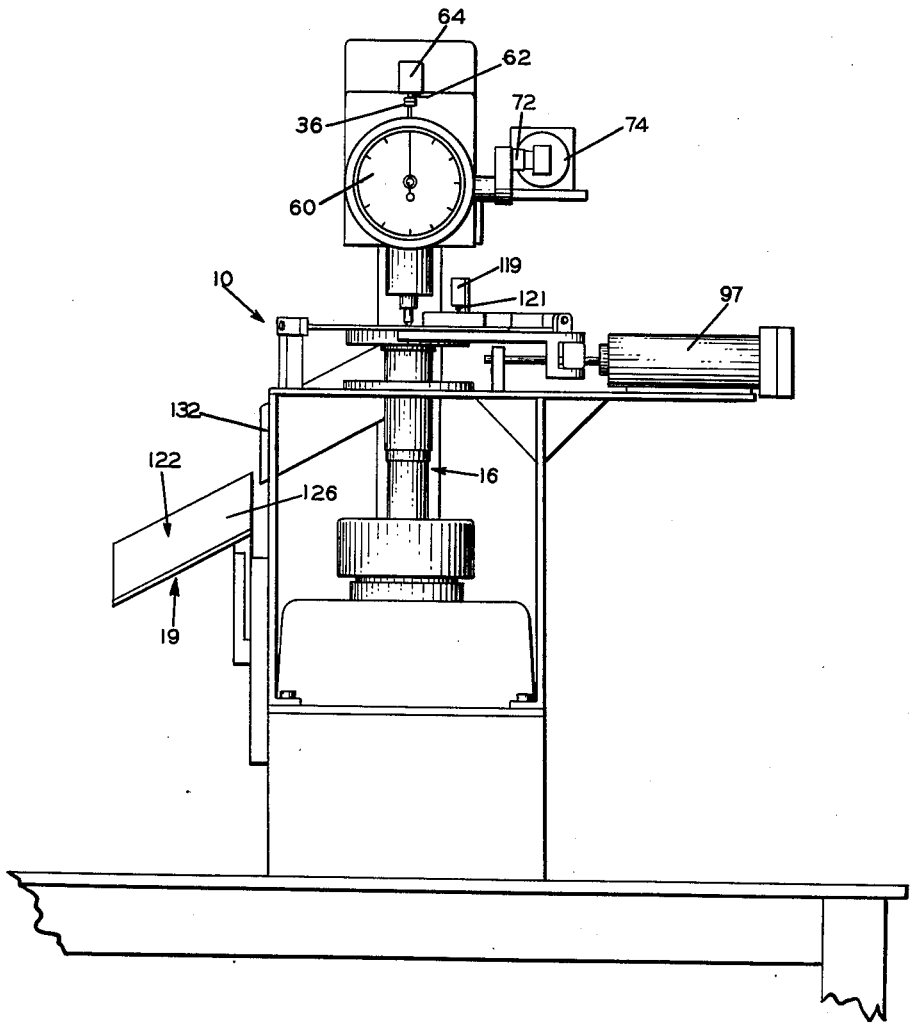
Fig. 2 is an end elevational view of the mechanism of Fig. 1.

This invention is premised on the provision of a mechanism which can automatically handle and hardness test predetermined portions of articles such as the cam contacting surfaces of engine tappets in a quick and easy manner and thus eliminate the possibilities of error caused by the human element and fatigue in the conventional manual handling and hardness testing thereof.

The mechanism as here devised comprises basically a hardness tester of the Rockwell type, although any well known form of hardness tester could be equally well adapted, a means for supporting the article to be tested in testing position, a turntable for receiving and moving the articles to be tested to the position of test and therebeyond after test, chute means or the like into which articles to be tested are manually deposited and from which they are delivered one by one for supply to the turntable, fluid operated means for simultaneously indexing the turntable and for moving the articles from the chute to the turntable and mechanism for sorting the tested articles into separately designated good and bad receptacles. The hardness tester, sorter and article testing support means are each fluid operated controlled by solenoid actuated valves operatively controlled by a master electronic system. The electronic system is controlled by appropriate manually actuated switches and automatically actuated micro-switches situated in the hardness testing mechanism at appropriate locations to establish the sequence time operation of the mechanism in accordance with events taking place in the testing cycle. One manual switch designated the pilot switch sets the mechanism into its normal cycle of operation and another manual switch designated a stop switch will stop the mechanism and instantly return it to its normal position. The micro-switches as here employed are four in number, one actuated upon the attainment of the minor load when an article is under test to stop the movement of the article supporting means, one for controlling the operation of the sorter when a soft article is detected, one for stopping the mechanism if an article of excessive length is encountered and one for limiting current coil operation as induced by the operation of the micro-switch for the sorter.

Referring to the drawings for more specific details of the invention 10 represents generally an automatic handling and hardness testing mechanism comprising basically a depth penetration hardness testing machine 12, a hopper or dispensing medium 14 for receiving the articles to be tested, a test position supporting stand 16, a turntable apparatus 18 for conveying the articles to be tested from the hopper to the test supporting stand, and thence from there to a point of final delivery and an apparatus 19 for sorting the tested articles in accordance with the test condition thereof, said machine, test, stand, turntable and sorting apparatus being controlled for the automatic time related operation to one another to carry out the desired hardness checking of articles of a predetermined nature from a master electronic system 20, a hydraulic system 22 and a pneumatic system 24.

The hardness testing machine 12 as disclosed by the drawings is of the Rockwell type although any hardness testing machine of a like nature could be equally well employed in the mechanism 10 for accomplishing a like purpose. The hardness testing machine 12 around which mechanism 10 evolves comprises a framework 26 including a base 28 and a head 30, said head 30 incorporating the hardness testing mechanism therein comprising a brale mechanism 32 supported for vertical sliding bearing supported movement in the head having a slender shaft 34 attached at one end, the extremity of which is adapted to engage and move a lever 36 pivotally mounted in the head, the purpose of which will hereinafter appear. A weight apparatus 38 is supported in head 30 comprising a lever member 40 supporting weights 42 at its free end and another lever member 44 having linkage connection 46 with the lever member 40 intermediate its length for supporting same, lever member 44 of which is normally held stationary and released for movement by a cam mechanism 48, a cam 50 of which engages the underside 52 of the free end thereof. The lever members 40 and 44 are each pivoted at opposite ends on the head 30 of framework 26 and extend in parallel horizontal relation to one another with lever member 44 disposed vertically about the lever member 40. The lever member 40 of which is linked to the lever member 44 is also held stationary by way of lever member 44 and upon release from its stationary position is adapted near its free end to engage a collar 54 on the brale mechanism intermediate the diamond work testing end 56 thereof and the free end of the shaft 34 effective to move the brale mechanism 32 vertically downward.

The lever 36 which is actuated by the movement of the shaft 34 of brale mechanism 32 is engageable near its free end on one side with a finger member 58 of a dial indicator hardness testing gauge 60 and on its opposite side a finger or button member 62 of a micro-switch 64, the purpose of which will hereinafter appear.

The lever member 40 has mounted on its top side a switch engaging member 66 adapted to engage a finger or button member 68 of a micro-switch 70 when the weighted lever member 40 upon its release from its normally stationary position moves a predetermined distance corresponding to the depth penetration of the work engaging end of the brale mechanism.

The cam mechanism 48 which controls the supported positions of lever members 40 and 44 is actuated by way of linkage connection 72 with a hydraulic pressure cylinder 74 mounted on the head of the hardness testing machine.

The test position supporting stand 16 is mounted in the base 28 of the hardness testing machine and comprises a central post member 75 supported in bearing relation in a sleeve member 76 for vertical sliding axial non-rotative movement therein having a test article receiving and seating portion at its upper end. The sleeve member 76 is in turn mounted for axial vertical sliding movement in a sleeve member 78 secured in the base 28 of the hardness tester. The post member 75 is externally threaded intermediate its length at 80 for threaded engagement with a rotary collar 82, said collar in turn bearing against the end of sleeve 76 such that rotation of the collar 82 will affect an axial vertical non-rotative movement of the post member 75 and test article receiving and supporting portion thereof. With the collar 82 rotated to the desired height adjustment of post member 75 the post member is adapted to be moving axially conjointly with sleeve member 76 through the action of a ram member 84 engageable with the lower extremity of sleeve member 76, said ram being actuated from a hydraulic pressure cylinder 85 in a horizontal direction to effect a raising or lowering of sleeve member 76 and post member 75 as is required in the automatic operation of mechanism 10. The ram is tapered in form and is journalled for sliding movement in a bearing 86 supported in an axial extension of sleeve 78 such that angular sliding relation is had between an angular face 88 on sleeve 76 and an angular face 90 of the ram whereby upon horizontal movement of the ram, the sleeve 76 is moved vertically up and down depending on the phase of operation of the ram. The axis of movement of the post member 75 is made to coincide with that of the brale mechanism so that the article to be tested in being seated and supported in central post 75 can be brought into axial engagement with the work engaging end of the brale.

The article hopper 14 or any other suitable mechanism for receiving the articles to be tested in quantity for the singular delivery thereof to a pre-selected position is mounted alongside the machine 12 permitting of the delivery of the article one by one to a point A from whence they are moved by appropriate pusher means 91 forming a part operably connected to a turntable indexing apparatus 92. The pusher means 91 is in the form of an arm 93 adapted to engage the external body of an article to be tested and push same from position A to position B in an arcuate channel section 94 extending substantially 90° from the point B to the normal position of the article seating and supporting portion of post member 75. The articles to be tested in being moved to point B have their upper portion received in one of several circumferentially spaced arcuate pockets 95 formed in the peripheral surface of a circular turntable 96 of turntable apparatus 18. The turntable is rotated in predetermined increments adapted to present a pocket 95 for receipt of one article in timed relation to the pusher means 91 by indexing apparatus 92.

said indexing apparatus and pusher means both being actuated from a hydraulic pressure cylinder 97. The indexing apparatus comprises a ratchet gear 98 securely mounted on the bottom of turntable 96 for rotation therewith engageable with a cooperable ratchet pawl 100 for the appropriate rotation of the turntable, said pawl 100 being conjointly connected with pusher arm 93 to the output shaft 102 of a piston, not shown, reciprocable under the influence of hydraulic fluid under pressure in cylinder 97. Resilient means 104 are provided engageable with the ears 106 of turntable 96 formed between the pockets 95 for positively maintaining the turntable in each indexed position.

A combination guiding and height gauging mechanism 108 is provided consisting of two elements 110 and 112 respectively pivotally spring tensioned upon a common axis 114, each element including an arcuate portion 116 and an arm portion 118. The elements 110 and 112 are each adapted to bear on the top extremity or upper face of the articles to be tested for the purpose of guiding the articles in their passage through the channel section 94 as moved by the turntable 96 and element 112 is additionally adapted to be engageable with a micro-switch 119 mounted above the element 112 such that upon upward pivotal movement of element 112 beyond a predetermined distance, as occasioned by an article of excessive height the upper face of the element 112 will engage a leaf spring 120 forming a part of the switch which will upon a sufficient movement thereof contact a finger 121 of the switch to trip same, the purpose of which will hereinafter appear.

In view of the necessity to automatically separate the acceptable hardness articles from those to be rejected, the sorting apparatus 19 is utilized. The sorting apparatus consists of a mechanism 122 having two chutes 124 and 126 respectively, the respective entrances 128 and 130 of which are adapted to be alternately associated with a chute 132 extending from the ejection point of the turntable to the entrances of the mechanism 122. The mechanism 122 is mounted for slidable movement adjacent the exit point of chute 132 under the influence of pneumatic pressure delivered to an air cylinder 134, the piston propelled shaft 136 of which is coupled at its free end to the mechanism 122. The shifting control for the sorting apparatus is obtained through the operation of micro-switch 70, the operational control of which will be further defined in detail hereinafter.

The proper sequence control and timing of the operable elements of the automatic hardness testing and handling mechanism 10 is obtained through the utilization of the electronic system 20 of which the micro-switches 64, 70 and 119 form a part wherein the operational actuation of any one of the switches sets the system 20 into operation for the controlled delivery of electrical current as the case may be by way of electrical circuit 140 for the operation singularly or conjointly of electrical solenoids 142, 144, 146 and 148 schematically illustrated in Fig. 8. The solenoids 142, 144, 146 and 148 control valves forming a part thereof for the controlled flow of hydraulic fluid under pressure from the hydraulic system 22 for the delivery to hydraulic cylinders associated therewith by way of a master hydraulic control valve mechanism 150 having the several solenoid controlled valves as a part thereof, an electric motor driven hydraulic pump 152 for supplying pressure fluid to the several hydraulic fluid cylinders 74, 85 and 97 by way of valve mechanism 150, and an oil supply tank 154 for receiving the fluid discharged from valve 150 for replenishing pump 152.

An electrical circuit 156 is supplied electrical current as controlled by electronic system 20 by way of a step-down transformer for the operation of a solenoid 158 actuated air valve for controlling the flow of air under pressure in pneumatic system 22, said air being controlled for delivery to air cylinder 134.

The electronic system 20 comprises in addition to the micro-switches 64, 70 and 119 primarily four interconnected time delay circuits 160, 162, 164 and 166 for properly controlling the required time delay sequence of the various operative elements of mechanism 10, and a pilot control switch 168. A multiple of current relay coils and corresponding current relay points are included in the electronic system 20 and circuits 140 and 156 such as coil 170, sets of points $170_1$, corresponding to coil 170, one set of which forms part of circuit 140, coil 172, three sets of points $172_1$ corresponding to coil 172, one set of which forms part of time delay circuit 160 and another set of which forms part of electrical circuit 140, coil 174 forming part of time delay circuit 160, two sets of points $174_1$, corresponding to coil 174, one set of which forms part of time delay circuit 162, and the other set of which forms part of circuit 140, coil 176 forming part of time delay circuit 162, corresponding sets of points $176_1$, one set forming part of circuit 164 and the other sets forming part of circuit 140, coil 178 forming part of time delay circuit 164 corresponding sets of points $178_1$, one set forming part of time delay circuit 166 and another set forming part of circuit 140, coil 180 forming part of time delay circuit 166, points $180_1$ corresponding to coil 180 forming a part of time delay circuit 166.

A micro-switch 182 forming a part of circuit 156 is mounted on a slide 184 for the chute mechanism 122 and has a finger or button member 186 adapted to be actuated upon movement of the piston shaft 136 by a member 188 attached thereto at one end limit of travel as propelled under the influence of air pressure delivered to cylinder 134. This switch limits the operational control of coil 180 so that during the stationary holding of chute 122 in the position of presenting chute 124 to chute 132 for the receipt of rejected articles it will not be unduly overheated.

In a normal operation of the mechanism 10 with the turntable carrying articles, such as tappets for which the mechanism was specifically designed, and having deposited a tappet 190 on the test article receiving and seating portion with the face 192 of the tappet facing upward in opposed relation to the brale of brale mechanism 32 and with the underside of the head 194 of the tappet bearing on the upper portion of post 75, the pilot switch 168 is closed to thus energize the electronic system for the operation thereof.

Figure 3:
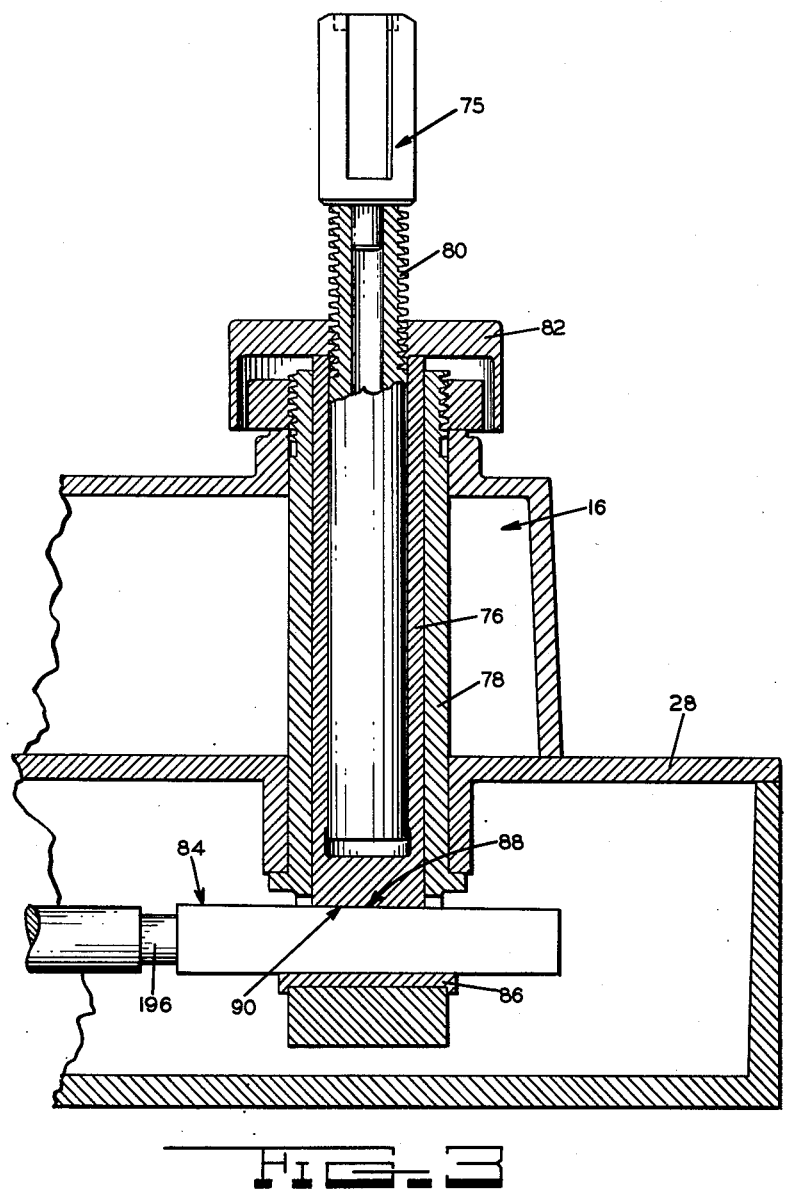
Fig. 3 is an enlarged fragmentary, cross-sectional view of the anvil or ram raising and lowering article supporting means for the mechanism of Fig. 1.

With the pilot switch 168 on and after a predetermined warm-up period, the cycle of operation of the mechanism begins with the energization of current relay coil 170 resulting in the closing of points $170_1$, and the subsequent actuation of solenoid 142. The actuation of solenoid 142 operates the valve associated therewith to effect a controlled flow of hydraulic fluid under pressure from hydraulic pump 152 by way of master valve mechanism 150 whereby the fluid under pressure is supplied to cylinder 85 resulting in the movement of ram 84 connected to a piston rod 196 of a piston, not shown, reciprocably mounted in cylinder 85. As the ram is moved to the right in viewing the structure of Fig. 3, the angular surface 90 thereof bears upon angular surface 88 of sleeve member 76 such as to cause a raising of sleeve 76 and post 75. With the raising of the post the tappet supported therein is also raised into contact with the brale of brale mechanism 32 and continues upward until the extremity of shaft 34 is moved a predetermined distance as indicated on the dial of gauge 60 effective to actuate the lever 36 to trip finger 62 of micro-switch 64.

The actuation of the micro-switch 64 energizes current relay coil 172 starting time delay circuit 160 resulting in the closing of current relay points $172_1$ corresponding thereto for the simultaneous actuation of solenoids 144 and 146, solenoid 144 actuating the valve associated therewith for the by-pass control of hydraulic pressure fluid to cylinder 85 for the purpose of stopping and holding the ram in its actuated position and solenoid 146 acting to trip the valve associated therewith for the supply of hydraulic pressure fluid to cylinder 74. The supply of hydraulic pressure fluid to cylinder 74 results in the movement of linkage connection 72 attached to the piston, not shown, reciprocated therein and the actuation of the cam mechanism 48 operated from the linkage 72 to release lever 44, whereupon weighted lever 40 held by way of suitable linkage 46 through lever 44 is free to move downwardly causing pivotal action of the lever 40 about its axis. The lever 40 with its free weight will move a distance depending upon the depth of penetration of the brale into the face of the tappet being tested wherein the motion of the lever 40 is transmitted by collar 54 to brale mechanism 32 resulting in forcing the brale to impinge upon the surface of the tappet face. If the tappet tested registers a predetermined desired hardness the mere operation of time delay circuit 160 will maintain the proper timed sequence of operation of events wherein upon the end of the time delay, current relay coil 174 thereof will be energized. The energization of coil 174 results in the closing of one relay set of points $174_1$, in circuit 162 and opening of points $174_1$, in circuit 140 so as to start time delay circuit 162 and simultaneously release the solenoid 146 permitting of the reverse actuation of the piston reciprocable in cylinder 74 and the connection 72 and cam mechanism 48 actuated thereby.

The reversal of operation of cam mechanism 48 from its weight releasing position once again restores the lever 40 and the weighted lever 44 to normal supported positions. At the conclusion of the time delay period regulation of time delay circuit 162, current relay coil 176 becomes energized and operates by way of opening and closing the respective current relay points $176_1$ in circuit 140 to release the hydraulic valve controlled positions of solenoids 142 and 144 resulting in the return of ram 84 to its normal retracted position under the action of pressure fluid delivered to cylinder 85 for the reverse operation of the piston reciprocable therein attached to ram 84 by rod 196. Simultaneously with the energizing of current relay coil 176, time delay circuit 164 is placed in operation providing for the actuation of solenoid 148 effective to actuate the hydraulic valve associated therewith for the delivery of pressure fluid to cylinder 97 to reciprocate the piston thereof for the ratchet indexing of turntable 96. The indexing of the table serves to place a new tappet in position for subsequent hardness testing thereof while simultaneously moving the tested tappet from the receiving and supporting post 75 and also moves along in channel 94 tappets to be subsequently moved to test position. As the tested tappet, which we will assume meets hardness specifications, is moved from the test supporting post 75, it will be ejected for delivery down chutes 132 and 126 for receipt in a receptacle, not shown.

At the end of time delay circuit 164 wherein current relay coil 178 becomes energized points $178_1$ in circuit 140 will be opened resulting in the release of solenoid 148 for the subsequent reversal of operation of the valve thereof and ratchet pawl means 100 of the turntable mechanism. This actuation of the piston in cylinder 97 reversing movement of pawl 100 serves to actuate pusher arm 93 forming a part thereof to move a tappet from point A to point B into a pocket 95 of the turntable. Time delay circuit 166 is placed into operation just as current relay coil 178 of time delay circuit is energized whereupon at the termination of the time delay operation of circuit 164 current relay coil 180 is energizing causing the energization of coil 170 and the recycling operation of the mechanism.

Should a tappet under test be detected by the hardness testing machine to be softer than desired resulting in the movement of lever 40 to a position beyond the normal permissible depth penetration of the brale determining desired hardness the micro-switch 70 will be engaged by member 66 secured to lever 44 to cause a tripping thereof. As the micro-switch is actuated a current relay coil 197 associated in the circuit thereof will be placed in operation, thus affecting by way of the appropriate opening and closing of normally opened and closed points $197_1$ corresponding thereto an operation of solenoid 158 and the valve actuated thereby to cause an air pressure operation of chute mechanism 122 by way of pneumatic cylinder to a position for the rejection receipt of the soft tappet by way of chutes 132 and 124 into an appropriate receptacle adapted to receive the rejected tappets. The chute mechanism will remain in the shifted position above defined until time delay circuit 166, which time controls the operation, is completed, at which time the chute mechanism will be returned to its normal at rest position with chute 126 in position for the receipt of tappets of acceptable hardness.

If in the course of testing, a tappet of excessive height is received in the turntable, that might be injurious to the brale if it were to pass to the point of test, the element 112 is provided such that upon the pivotal movement thereof the micro-switch 119 is engaged resulting in breaking the operating circuit for the mechanism to thus automatically cause disruption of operation thereof until such time as the over-length tappet is removed and the mechanism is set back into operation.

For the purpose of providing a safe over-all control of operation of the mechanism a stop switch 198 is provided in the electronic control circuit of the mechanism so that an instant disruption can be effected for any reason whatsoever.

In viewing the master electronic system and the several electrical circuits controlled thereby it is to be observed that upon the energization of a current relay coil that all current relay points corresponding thereto which are normally open are closed and those normally closed are opened such as regards current relay coil 174 and the respective normally open and closed relay points 174₁.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. Mechanism for the automatic hardness testing of the predetermined surface of articles comprising a hardness tester including an article penetrating member, weight supporting lever means interconnected with the penetrating member, fluid power means for controlling the imposition of the weight supported by the lever means on the penetrating member, a normally open electrical switch associated with the lever means, a normally open electrical switch associated with the penetrating member, means for receiving and conveying the articles to be tested in singular manner from a point of deposit thereon to a point of testing adjacent the penetrating member with the surface of the article to be tested in juxtaposition to the article contacting portion of the penetrating member, fluid power means for controlling the operation of the receiving and conveying means, means for receiving and supporting the article at its point of testing, fluid power means for actuating the article supporting means in a direction to move the surface of the article into and out of engagement with the article contacting portion of the penetrating member, means for sorting the tested articles according to their acceptance or rejection, fluid power means for actuating the sorting means, and an electrical current supplied circuit having the aforementioned switches and also a plurality of actuated valve means therein, one associated with each of the respective aforementioned power means, said valve means controlling the flow of pressure fluid to the fluid power means dependent upon the actuation of the electrical switches in the circuit for the predetermined desired sequence operation of the article penetrating member, the article receiving and conveying means, the article supporting means and the article sorting means.

2. Mechanism for the automatic hardness testing of the predetermined surface of articles comprising a hardness tester including a surface penetrating member, weight supporting lever means for actuating the penetrating member, means for supporting the lever means free from imposing the weight on the penetrating member, and fluid power means for controlling the lever supporting means, electrical switch means engageable by the penetrating member upon a predetermined movement thereof, another electrical switch means engageable upon an opposite predetermined movement of the penetrating member, means for receiving and conveying the articles to be tested from a point of deposit to a point of ejection, means for lifting the articles one by one from the conveying means and supporting and moving same at the testing point into engagement with the penetrating member, fluid power means for actuating the conveying means, fluid power means for actuating the lifting means, means for sorting the ejected articles in accordance with the acceptance or the rejection thereof, fluid power means for actuating the sorting means, time operation controlling electrical circuit having the aforementioned electrical switches therein, and a plurality of electrical solenoids in the circuit for controlling the actuation of fluid flow control valves, one associated with each fluid power actuating means.

3. Mechanism for the automatic hardness testing of the predetermined surface of articles comprising a hardness tester including a surface penetrating member, weight supporting lever means for actuating the penetrating member, means for supporting the lever means free from imposing the weight on the penetrating member, and fluid power means for controlling the lever supporting means, electrical switch means engageable by the penetrating member upon a predetermined movement thereof, another electrical switch means engageable upon an opposite predetermined movement of the penetrating member, means for receiving and conveying the articles to be tested from a point of deposit to a point of ejection, pivotal means engageable with the predetermined surface of the article to be tested intermediate the point of deposit and the point of test thereof as moved therebetween by the conveying means, and electrical switch means engageable by the pivotal means upon a predetermined movement thereof, means for lifting the articles one by one from the conveying means and supporting and moving same at the testing point into engagement with the penetrating member, fluid power means for actuating the conveying means, fluid power for actuating the lifting means, means for sorting the ejected articles in accordance with the acceptance or rejection thereof, fluid power means for actuating the sorting means, a time operation controlling electrical circuit having the aforementioned electrical switches therein, and a plurality of electrical solenoids in the circuit for controlling the actuation of fluid flow control valves, one associated with each fluid power actuating means.

4. Mechanism for the automatic hardness testing of the predetermined surface of metallic articles or the like comprising a hardness tester including a vertically reciprocable article surface penetrator freely permissibly movable a predetermined distance in one direction, lever means engageable with the penetrator for movement in the opposite direction to its freely permissible movement, weights carried by the lever means, and fluid power means for actuating the cam means, an electrical switch engageable by one end of the penetrator opposite from its article contacting end upon a predetermined movement of the penetrator in its freely permissible direction, an electrical switch engageable by the lever means upon movement of the penetrator beyond a predetermined distance in a direction induced by the imposition of the weighted lever means thereon, a turntable for receiving and conveying the articles to be tested from a point of deposit to a point of test and therebeyond to a point of ejection therefrom, fluid power means for actuating the turntable, a chute means for sorting the articles ejected from the turntable in accordance with their acceptance or rejection, fluid power means for actuating the chute means, means for receiving and lifting the articles to be tested at the point of test into engagement with the surface contacting end of the penetrator for the movement thereof in one direction to have its opposite end actuate the electrical switch associated therewith, fluid power means for actuating the lifting means, a time operation controlling electrical system having the aforementioned switches therein, and a plurality of electrically operated solenoids in the system, at least one associated with each fluid power means for controlling the delivery of pressure fluid thereto, said switch actuated by the movement of the end of the penetrator opposite from its surface contacting end initiating the timing cycle of operation of the electrical system and said switch actuated upon the predetermined movement of the penetrator in its opposite direction effective to control the operation of the fluid power means of the sorting means.

5. Mechanism for the automatic hardness testing of metallic articles and the like comprising a hardness tester including an article surface penetrator, weight means adapted to be imposed on the penetrator for one directional movement thereof, a free connection between the penetrator and the weighted means in its other direction of movement, fluid power operated means for imposing and removing the weighted means from the penetrator, an electrical switch actuated to closed position upon the predetermined movement of the penetrator in one direction, another electrical switch actuated to closed position upon the predetermined movement of the penetrator in its opposite direction, a turnable for receiving aricles to be tested and for conveying them to a testing point and therebeyond for ejection therefrom, fluid power operated pawl and ratchet means for rotating the turntable, means for receiving and lifting the articles to be tested at the point of test into engagement with the article surface contacting end of the penetrator, fluid power operated ram means for moving the receiving and lifting means, fluid power operated means for sorting the acceptable and rejected articles tested from one another, fluid power for the several fluid power operated means, electrical solenoid actuated valves for the respective fluid power operated means, and an electrical current supplied system having the aforementioned switches and solenoids as parts thereof for the time sequence control of the various fluid power operated means.

6. Mechanism for the automatic hardness testing of metallic articles and the like comprising a hardness tester including an article surface penetrator, weight means adapted to be imposed on the penetrator for one directional movement thereof, a free connection between the penetrator and the weighted means in its other direction of movement, fluid power operated means for imposing and removing the weighted means from the penetrator, an electrical switch actuated to closed position upon the predetermined movement of the penetrator in one direction, another electrical switch actuated to closed position upon the predetermined movement of the penetrator in its opposite direction, a turntable for receiving articles to be tested and for conveying them to a testing point and therebeyond for ejection therefrom, fluid power operated pawl and ratchet means for rotating the turntable, a channel member for guarding the articles being conveyed by the turntable from their point of deposit to the point of test, pivotal means engageable with the surface of the articles to be tested arranged intermediate their point of deposit on the turntable and the point of testing, and an electrical switch actuated to open position by a predetermined pivotal movement of the pivotal means, means for receiving and lifting the articles to be tested at the point of test into engagement with the article surface contacting end of the penetrator, fluid power operated ram means for moving the receiving and lifting means, fluid power operated means for sorting the acceptable and rejected articles tested from one another, fluid power for the several fluid power operated means, electrical solenoid actuated valves for the respective fluid power operated means, and an electrical current supplied system having the aforementioned switches and solenoids as part thereof for the time sequence control of the various fluid power operated means.

7. Mechanism for the automatic handling and hardness testing of articles comprising a hardness tester including a weight controlled penetrator, means for receiving and conveying the articles to be tested, means for receiving and supporting each article at the point of testing and for moving said article vertically into contact with the penetrator, means for sorting the tested articles, and power operated means for actuating the sorting means, power operated means for actuating the receiving and conveying means, power operated means for actuating the receiving and supporting means, power operated means permitting of the actuation of said penetrator and an electrical system for controlling the operation of the power operated means including a pair of make and break switches selectively actuated by the penetrator for controlling the sorting means in accordance with the hardness of the articles tested, said power operated means for the receiving and conveying means, said penetrator and receiving and supporting means are all hydraulic operated means supplied with pressure hydraulic fluid from a common pump source.

8. Mechanism according to claim 7 wherein each hydraulic power operated means is controlled by a valve actuated by solenoid means provided in the electrical system.

9. Mechanism according to claim 7 wherein the power operated means for the sorting means is air operated and wherein a solenoid arranged in the electrical system actuates a valve which controls the flow of air in said power operated means.

RICHARD L. SIEGGREEN.

References Cited in the file of this patent

UNITED STATES PATENTS

| Number | Name | Date |
|---|---|---|
| 1,133,273 | Flaherty | Mar. 30, 1915 |
| 1,652,298 | Burton | Dec. 13, 1927 |
| 1,762,497 | Wilson | June 10, 1930 |
| 1,885,972 | Wilson | Nov. 1, 1932 |
| 2,338,868 | Owens | Jan. 11, 1944 |
| 2,368,796 | Ardell | Feb. 6, 1945 |
| 2,523,555 | Boosey | Sept. 26, 1950 |